March 9, 1965    H. GÜLKER    3,172,796
METHOD OF FORMING CONICAL-SHAPED CONTAINERS
OF THERMOPLASTIC MATERIAL
Filed Sept. 23, 1960    3 Sheets-Sheet 1
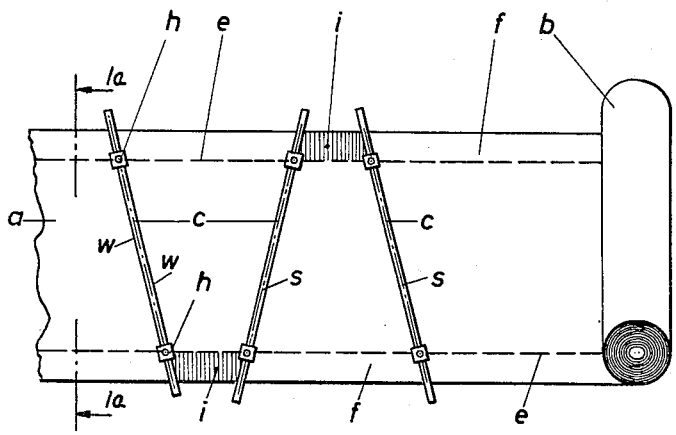
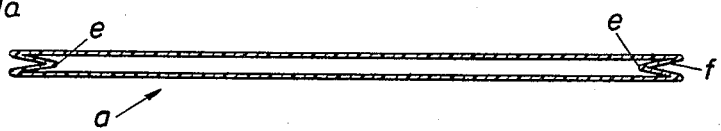
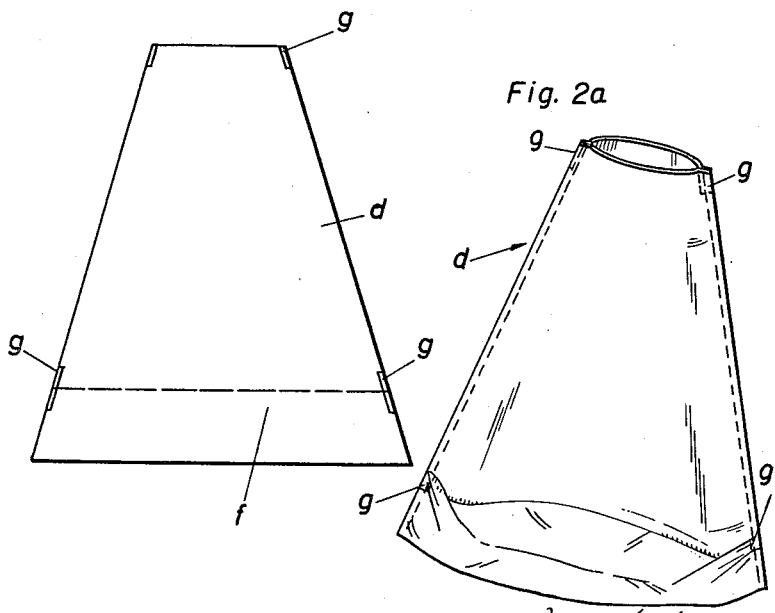
Inventor:
Heinz Gülker
by: Michael S. Striker
Attorney March 9, 1965 H. GÜLKER 3,172,796
METHOD OF FORMING CONICAL-SHAPED CONTAINERS
OF THERMOPLASTIC MATERIAL
Filed Sept. 23, 1960 3 Sheets-Sheet 2

Inventor
Heinz Gülker
by Michael S. Striker
Attorney

March 9, 1965 H. GÜLKER 3,172,796
METHOD OF FORMING CONICAL-SHAPED CONTAINERS
OF THERMOPLASTIC MATERIAL
Filed Sept. 23, 1960 3 Sheets-Sheet 3

Inventor
Heinz Gülker
by Michael S. Striker
Attorney

3,172,796
METHOD OF FORMING CONICAL-SHAPED CONTAINERS OF THERMOPLASTIC MATERIAL
Heinz Gülker, Schaferstrasse 16, Obernkirchen, Nethersaxony, Germany
Filed Sept. 23, 1960, Ser. No. 58,082
Claims priority, application Germany, Sept. 25, 1959, G 28,033
5 Claims. (Cl. 156—269)

The present invention relates to a method of producing containers for fluids and pulverulent materials, and especially for milk and other beverages.

Although milk is one of the most important food items and consumed in great volumes, it is to the greatest extent still sold in glass bottles and stored therein for some time both prior to and after being sold.

Although a glass bottle forms in some respects an ideal container for storing and selling milk and other beverages, it also has very serious disadvantages which have caused the industry for a long time to search for suitable substitutes. One of the greatest disadvantages of a glass bottle is the constant danger of breakage. Furthermore, empty bottles which because of their expense are to be returned for reuse require a considerable effort in order to clean them sufficiently so as to be absolutely sterile. Last but not least, the transportation as well as the storing of bottles, and especially of large numbers thereof, requires rather expensive means such as bottle cases, boxes, baskets, or the like.

For these reasons, it has been customary for many years no longer to sell many products in glass bottles which are relatively expensive, hard to clean, fragile, and therefore difficult to transport and to store, but in metal or cardboard containers which may be more easily and inexpensively produced and discarded after being used only once. Although in the dairy industry there has been just as great a need for more suitable containers, those containers which have been developed in the past have not proved entirely satisfactory since either their manufacture was too complicated or they were of an unsuitable shape, or they were too expensive or of an insufficient solidity, or they consisted of a material which affected the taste of the milk.

After many years of research and experimentation the present inventor has finally succeeded in completely solving this difficult problem by providing a container which may be regarded as ideal for beverages and especially for milk since it is made of a very inexpensive but very resistant material which by itself is noncorrosive and water-repellant and thus does not need any protective impregnation or coating and which also has the great advantage over metal or cardboard containers that it will not affect the taste of beverages and especially milk.

These containers may according to the invention be very inexpensively mass-produced of a thermoplastic material by continuously feeding a flat tubular strip which is provided with lateral, inwardly extending folds, and by then successively combining the two flat layers of this tubular strip by means of welded seams which are applied in pairs and extend in a zig-zag formation across the entire width of the strip. The two seams of each pair are preferably disposed closely adjacent and parallel to each other so as to form the limiting edges of two adjacent containers of a conical shape. The individual containers are then severed from each other between these parallel seams, and finally each individual container is provided with an opening at its narrower or pointed end through which it may be subsequently filled with milk or another beverage. This opening is preferably produced by a cut which is made alternately along the inner edge of one lateral fold or the other of the tubular material.

It is further advisable to reinforce the welding seams adjacent to the opening and possibly also adjacent to their points of intersection with the bottom fold of the container.

In order to attain containers of a considerable solidity which are capable of standing up by themselves, it is advisable to extend the ends of the welding seams across the bottom folds in a direction at right angles to the longitudinal direction of these folds.

In the latter case it is also of considerable advantage if these ends of the welding seams of one container are spaced very closely to the corresponding ends of the welding seams of the adjacent containers. The opening in each container may then be formed by cutting off the tip thereof so that practically no material will be lost.

A high production output of the new containers within a certain length of time may be attained by utilizing as a raw material a flat, longitudinally open tube with lateral folds in which the opening is formed by a narrow central longitudinal split in one flat outer layer of the tube. A pair of closely adjacent welding seams are then continuously formed which extend in a zig-zag formation across the width of each strip of this layer so that the welding seams in both strips extend symmetrically to each other. The other flat layer of the tube is thereupon cut longitudinally along a central line between the adjacent edges of the two strips of the first layer so that these edges and those formed by the longitudinal cut form the edges of the openings of all containers. Thus, two continuous rows of containers will be produced simultaneously side-by-side.

Since the foil material which is used for producing the containers according to the inventive method may sometimes have imperfections in the form of minute pores through which liquid material held in the container may gradually seep, it is advisable to use two relatively thin superimposed foils which adhere to each other rather than to use one thicker foil. Any tiny leaks in one foil will thus be covered and stopped by the other foil.

The method according to the invention is preferably carried out continuously by welding the zig-zag-shaped seams, then severing the adjacent conical containers from each other by cutting through the layers of the folded tube between the adjacent seams, and cutting the material to form the opening in each container while the folded tube is continuously fed in the direction of production from a large supply thereof.

The above-mentioned objects, features, and advantages of the present invention will become further apparent from the following detailed description thereof, particularly when read with reference to the accompanying drawings, in which—

FIGURE 1 illustrates diagramatically the inventive method of producing a container;

FIGURE 1a is a cross section, drawn at an enlarged scale and taken along line 1a—1a of FIGURE 1;

FIGURE 2 shows a side view of the finished container produced according to FIGURE 1;

FIGURE 2a is a perspective view showing the container of FIGURE 2 in opened condition;

FIGURE 6 illustrates a further modification of the inventive method; while

According to the invention, as illustrated in FIGURE 1, a continuous tube *a* of a thermoplastic material which consists of two layers which are connected by lateral inwardly extending folds as shown in cross section in FIGURE 1*a* is unwound from a supply roll *b* thereof and passed underneath rod-shaped welding electrodes *c* which are arranged in a zig-zag formation relative to each other and extend across the entire width of tube *a*. Each of electrodes *c* is adapted to produce two closely adjacent parallel welding seams *w* coinciding with the longitudinal edges of the electrodes *c*, which connect the two superimposed layers of the tube to each other. The superimposed connected layers are then cut along cutting lines *s* indicated in dash-dotted lines in FIGURE 1, extending respectively parallel to and between the closely adjacent weld seams. The frusto-conical containers *d* which are thus produced, but which at this time are still closed on all sides are then opened at their narrower ends by means of a cut along the inner edge *e* of inward folds *f*.

One of the containers *d* produced according to this method is illustrated in flat condition in FIGURE 2 and in opened condition in FIGURE 2*a*. These figures also show that the welding seams may be provided at an area adjacent to the opening of the container and adjacent to their points of intersection with the bottom fold with reinforcements *g* which may be produced by means of separate welding jaws *h* on the electrodes *c*. The hatched parts *i* of the tube may be severed therefrom by stamping or cutting, and the cut edge results in the opening of the respective container, as mentioned above. The portions *i* have been hatched in the various figures to more clearly indicate what parts of the folded strip have to be cut away during forming of the containers.

Figure 3:
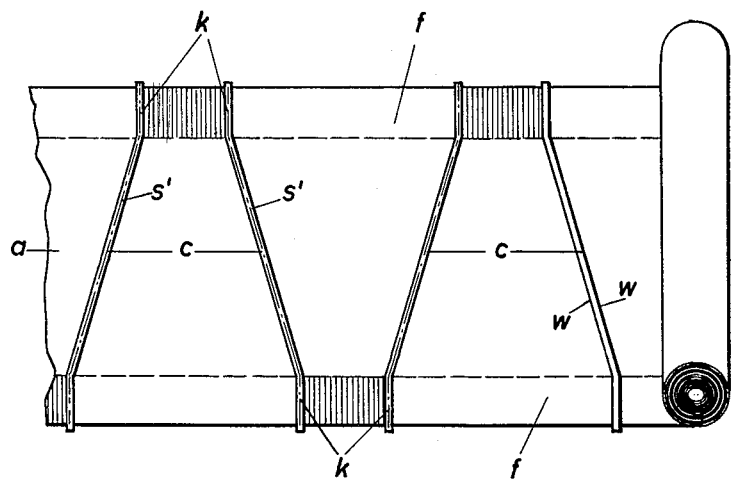
FIGURE 3 illustrates diagrammatically the inventive method for producing a container of a different shape.
Figure 4:
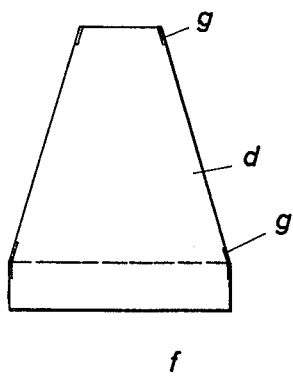
FIGURE 4 shows a side view of the finished container produced according to FIGURE 3.

FIGURE 3 illustrates a modification of the invention according to which the electrodes *c*, which are arranged in a zig-zag formation across the width of the tube, extend at their ends *k* which cross the lateral folds *f* of tube *a* in a direction at right angles to these folds. The tube *a* is, after welding, cut along cutting lines *s*, as indicated in dash-dotted lines of FIGURE 3, and the portions indicated by hatching are severed to provide a plurality of separated containers. FIGURE 4 illustrates the shape of the container which is thus produced and which is especially sturdy.

Figure 5:
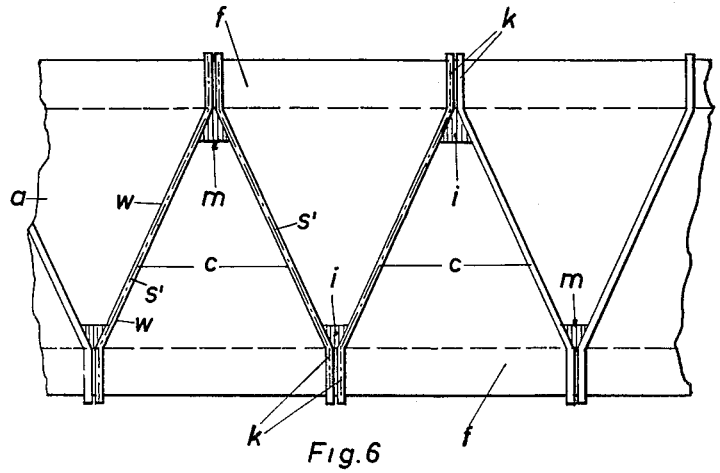
FIGURE 5 illustrates diagrammatically a modification of the inventive method of producing a container of a shape similar to that shown in FIGURE 4.

FIGURE 5 shows the use of electrodes *k* of the same shape as shown in FIGURE 3. However, in this case the ends *k* of each electrode which extend at right angles to the lateral folds *f* of tube *a* are disposed in close proximity to the corresponding ends of the adjacent electrodes. The tube *a* is then cut, after welding, along cutting lines *s'* indicated in dash-dotted lines in FIGURE 3. The openings in the containers or bags thus produced are attained by cutting off the tips of the bags along lines *m*. It is thus possible to convert the folded tube *a* into sturdy bags practically without any loss in material since only the small hatched parts *i* will be wasted.

Figure 7:
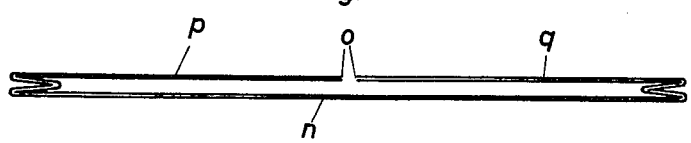
FIGURE 7 shows an end view of the continuous folded tube utilized in the method according to FIGURE 6.
Figure 6:
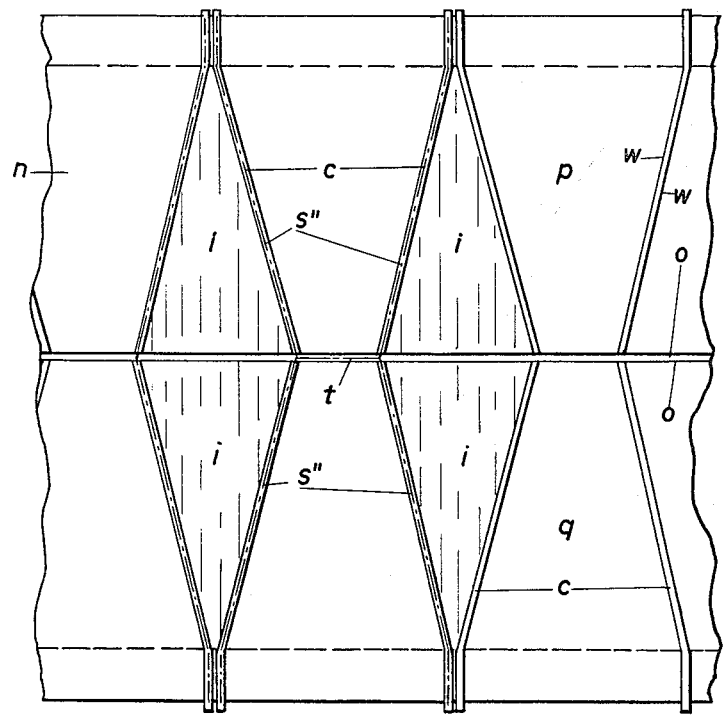

According to the further modification of the invention as shown in FIGURES 6 and 7, the raw material of which the bags are made consists of a tube *n* with lateral folds which is split at the longitudinal center of one layer and thus has two adjacent longitudinal edges *o, o*. Each of the two longitudinal strips *p* and *q* is successively provided with two closely adjacent welding seams *c* extending in a zig-zag formation across the width of the respective strip in such a manner that the pairs of welding seams *c, c* at both sides of the tube extend symmetrically to each other. When the two layers are severed between the closely adjacent welding seams along cutting lines *s''* as indicated in dash-dotted lines in FIGURE 6, and when also the lower layer is severed by a longitudinal cut underneath and between the edges *o, o*, as indicated by the dash-dotted line *t* each operating step will result simultaneously in two containers. This modification of the inventive method in which two rows of containers are produced simultaneously from one strip of tubular material is very suitable for a mass-production, although it entails the loss of a greater amount of material, as indicated in FIGURE 6 by the hatched portions *i*.

The new container which is preferably made of a transparent material may therefore be produced by a single operation and practically without loss in material. The material of the bags is very inexpensive but very resistant to tension stresses, and the manner of production is completely sanitary. When the bag is being filled, which may be carried out automatically by a suitable filling machine, the bottom of the container will unfold by itself. Because of the conical shape of the container this bottom will give it great sturdiness so that the container will safely stand up by itself. After being filled and sealed in a very simple manner by an automatic welding machine, it will also present a very pleasant appearance.

Although my invention has been illustrated and described with reference to the preferred embodiments thereof, I wish to have it understood that it is in no way limited to the details of such embodiments, but is capable of numerous modifications within the scope of the appended claims.

Having thus fully disclosed my invention, what I claim is:

1. In a method of producing substantially frusto-conical containers having each an open top and a closed bottom end of a width greater than the top end thereof, comprising the steps of welding a tubular strip of thin thermoplastic material in flat condition and having a pair of superimposed wide layers integrally joined at longitudinal edges thereof by inwardly extending folds along closely adjacent pairs of parallel welding seams extending in zig-zag formation transversely across the entire width of said strip and each pair of parallel welding seams having opposite end portions extending at a right angle over said inwardly extending folds; severing the strip between said parallel seams to form a plurality of closed containers having at one end thereof a width smaller than at the other end thereof; and forming an opening in each of said containers at the small end thereof so that each of said open containers may be formed into a substantially frusto-conical container when filled with flowable material.

2. In a method of producing substantially frusto-conical containers having each an open top and a closed bottom end of a width greater than the top end thereof, comprising the steps of welding a tubular strp of thin thermoplastic material in flat condition and having a pair of superimposed wide layers integrally joined at longitudinal edges thereof by inwardly extending folds along closely adjacent pairs of parallel welding seams extending in zig-zag formation transversely across the entire width of said strip and each pair of parallel welding seams having opposite end portions extending at a right angle over said inwardly extending folds and closely adjacent to the welding seam end portions of the following pair of welding seam end portions; severing the strip between said parallel seams to form a plurality of closed containers having at one end thereof a width smaller than at the other end thereof; and cutting off the end of each closed container inwardly of the inner edge of the inwardly extending folds at the smaller end thereof to provide an opening at said smaller end so that each of said open containers may be formed into a substantially frusto-conical container when filled with flowable material.

3. In a method of producing substantially frusto-conical containers having a open top end and a closed bottom end of a width greater than at the top end thereof, comprising the steps of feeding a tubular strip of thin thermoplastic material in flat condition and having a pair of superimposed wide layers integrally joined at longitudinal edges thereof by inwardly extending folds; slitting one of the wide layers along a longitudinal center line; welding said superimposed wide layers along pairs of closely adjacent pairs of parallel welding seams extending in zig-zag formation across the full width of said superimposed layers and being arranged symmetrically with respect to said longitudinal center line in a manner so that successive pairs of closely adjacent parallel welding seams are alternatively closer spaced from each other at said longitudinal center line that at the outer longitudinal edges thereof and closer spaced from each other at said outer longitudinal edges thereof than at said longitudinal center line; severing the strip between said pairs of parallel welding seams; and slitting the other of said wide layers along a longitudinal center line so as to form a plurality of containers each having an open end of a width smaller than the closed end thereof and a height substantially equal to half the width of said strip so that said open containers may be formed into substantially frusto-conical containers when filled with flowable material.

4. In a method of producing substantially frusto-conical containers each having an open top and a closed bottom end of a width greater than the top end thereof, comprising the steps of welding a tubular strip of thin thermoplastic material in flat condition and having a pair of superimposed wide layers integrally joined at longitudinal edges thereof by inwardly extending folds along closely adjacent pairs of parallel welding seams extending in zig-zag formation transversely across the entire width of said strip and each pair of parallel welding seams having opposite end portions extending at a right angle over said inwardly extending folds; reinforcing said welding seams in the region of the intersections thereof with the inner edges of the inwardly extending folds; severing the strip between said parallel seams to form a plurality of closed containers having at one end thereof a width smaller than at the other end thereof; and cutting off the end of each closed container inwardly of the inner edge of the inwardly extending fold at the smaller end thereof and through reinforced parts of the welding seams to provide an opening at the smaller end with reinforcements at the outer ends of said opening.

5. In a method of producing substantially frusto-conical containers each having an open top and a closed bottom end of a width greater than the top end thereof, comprising the steps of feeding an elongated tubular strip of thin thermoplastic material in flat condition and having a pair of superimposed wide layers integrally joined at longitudinal edges thereof by inwardly extending folds; welding said strip along closely adjacent pairs of parallel welding seams extending in zig-zag formation transversely across the entire width of said strip and each pair of parallel welding seams having opposite end portions extending at a right angle over said inwardly extending folds; severing the strip between said parallel seams to form a plurality of closed containers having at one end thereof a width smaller than at the other end thereof; and cutting off the end of each closed container inwardly of the inner edge of the inwardly extending fold at the smaller end thereof to provide an opening at said smaller end, said welding, severing, and cutting off steps being carried out while said strip is continuously fed in the direction of its elongation.

References Cited by the Examiner
UNITED STATES PATENTS

| | | | |
|---|---|---|---|
| 2,001,785 | 5/35 | Hurt | 154—85 |
| 2,157,054 | 5/39 | Gammeter | 93—8 |
| 2,265,075 | 12/41 | Knuetter | 229—61 |
| 2,470,990 | 5/49 | Kennedy | 154—85 |
| 2,688,914 | 9/54 | Eckler | 229—61 |
| 2,714,416 | 8/55 | Fener | 154—42 |
| 2,935,241 | 5/60 | Brady | 93—35 |
| 3,023,679 | 5/62 | Piazze | 93—8 |

EARL M. BERGERT, *Primary Examiner.*

CARL F. KRAFFT, *Examiner.*